United States Patent Office 3,457,409
Patented July 22, 1969

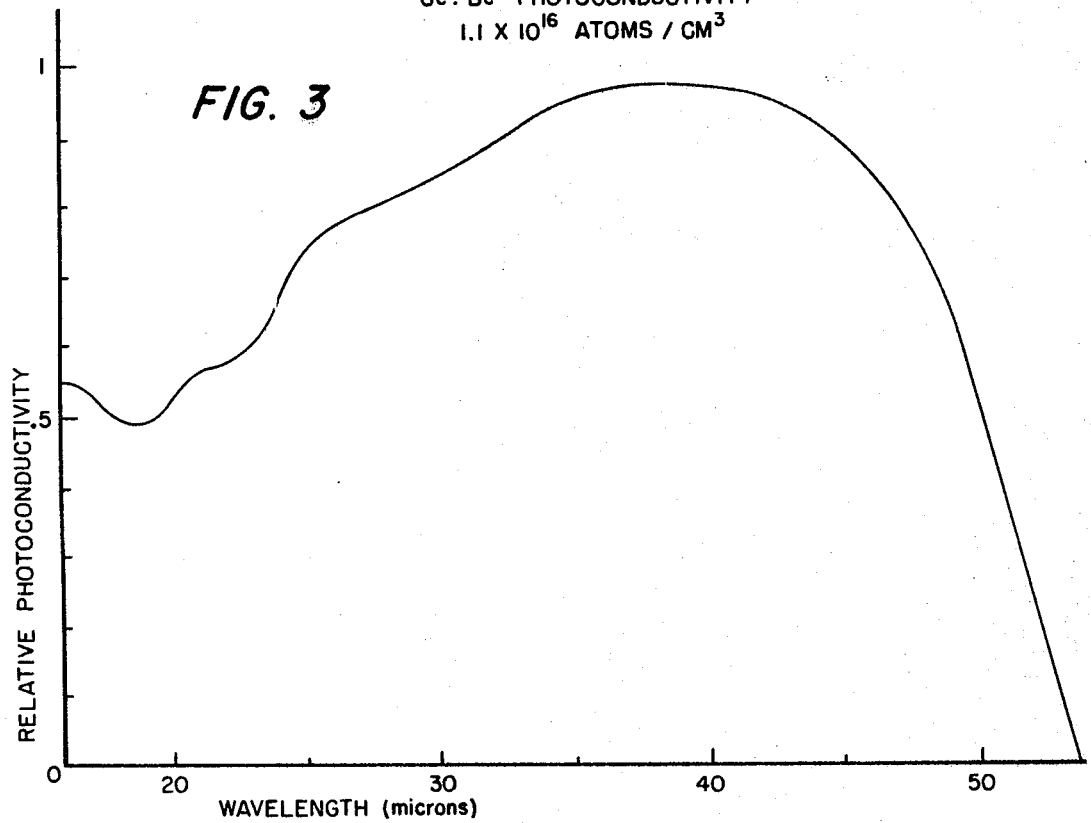
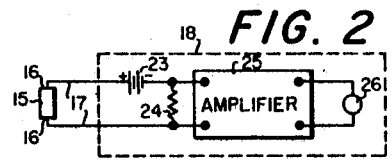
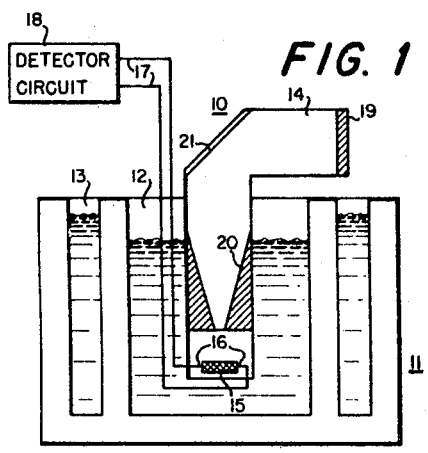
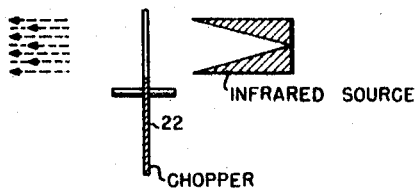
INVENTORS
HENRY SHENKER
WILLIAM J. MOORE
EDWARD M. SWIGGARD

3,457,409
**BERYLLIUM DOPED GERMANIUM PHOTO-
CONDUCTIVE DETECTOR**
Henry Shenker, Alexandria, Va., William J. Moore, Washington, D.C., and Edward M. Swiggard, Alexandria, Va., assignors to the United States of America as represented by the Secretary of the Navy
Filed Sept. 2, 1966, Ser. No. 577,098
Int. Cl. H01j *39/00, 39/12;* H01l *13/00*
U.S. Cl. 250—83.3                       2 Claims

ABSTRACT OF THE DISCLOSURE

High purity germanium doped with beryllium in concentrations of from $1 \times 10^{15}$ to $2 \times 10^{16}$ atoms of beryllium per cm.$^3$ of germanium is an efficient photoconductive detector for infrared radiation in the region of 10–52 microns.

---

The invention described herein may be manufactured and used by or for the Government of the United States of America for governmental purposes without the payment of any royalties thereon or therefor.

This invention relates to infrared detector devices which utilize doped germanium material as the detector element.

An object of the present invention is the provision of new germanium semiconductor materials which at liquid helium temperature exhibit strong photoconductive response to infrared radiation in the region of 10 to 52 microns and little structure in the waveform of the spectral response curve at wavelengths of 10 to 52 microns.

A further object is the provision of far infrared detector devices which utilize the photoconductive property of the aforesaid new germanium semiconductor materials for the detection of infrared radiation in the region of 10 to 52 microns.

The above and other objects are accomplished by the present invention in which it has been found that efficient extrinsic germanium detectors for infrared radiation in the region of 10 to 52 microns wavelength may be made by incorporating into high purity germanium, by which term is meant herein germanium containing not more than $2 \times 10^{12}$ atoms of electrically active impurities, trace amounts of beryllium to the extent that the resulting semiconductor material is doped with from $1 \times 10^{15}$ to $2 \times 10^{16}$ atoms of beryllium per cm.$^3$ of germanium.

In the use of the new extrinsic germanium detectors for measurement of far infrared radiation, the photoconductive detector element is arranged in a light pipe to receive radiation to be detected and to be maintained at or near liquid helium temperature. An external circuit is connected to the detector element to measure its change in conductivity due to the incident infrared radiation. This change in conductivity of the detector produces a change in the current flow of the external circuit, which change is amplified and displayed by a suitable indicating or recording means. Provision is made for filtering out all radiation other than that of the infrared band to be detected. Provision is also made for chopping the incoming radiation to obtain a pulsating signal which facilitates amplification and recording of small photocurrents.

The invention will be more fully understood from the following description when read in conjunction with the accompanying drawing in which like numerals indicate like parts and:

FIG. 1 is a schematic showing, partly in section, of a detector cell containing a photoconductive detector element of the invention.

FIG. 2 is a schematic showing of a conventional external circuit which may be used with a photoconductive infrared detector of the invention, and FIG. 3 is a curve depicting the photoconductivity response on an equal energy basis of an infrared detector of the invention as a function of the wavelength of incident infrared radiation.

Referring to FIG. 1 of the drawing, a detector cell, indicated generally at 10, is supported in a conventional manner in a body of liquid helium contained in the inner chamber of a double Dewar 11 of known construction. Means, not shown, are provided for maintaining a body of liquid helium in the inner chamber 12 and a body of liquid nitrogen in the outer chamber 13 of the double Dewar.

The detector cell 10 comprises a light pipe 14 made of a low thermal conductivity material, such as stainless steel, which contains the photoconductive detector element 14 in the lower section thereof. The detector element 15 may be a wafer of any suitable dimensions, such as 1 x 2 x 8 mm. in width, thickness and length. A pair of ohmic electrodes 16, 16 are secured to opposed parallel faces of the detector element 15. Leads 17, 17 are secured to and couple the electrodes 16, 16 to a signal detector circuit 18 for measuring the photocurrent developed as a result of the radiation incident on the photoconductive detector element 15.

The light pipe 14 is provided at the outer or radiation-receiving end with a filter 19 for cutting-off radiation to which germanium (Ge) is intrinsically responsive, which is up to about 1.8 microns. The filter 19 may be made of black polyethylene. A light cone 20, which may be made of brass, is provided in the light pipe for promoting the absorption of the received radiation by the detector element 15. A mirror 21 is provided in the wall of the light pipe 14 for convenience in changing the direction of the received radiation.

A light chopper 22, which may be of conventional design, is shown arranged between the infrared source, indicated in a conventionalized manner, and the filter 19 on the light pipe 14 for causing a modulated radiation signal to be inicdent on the photoconductive detector element 15 whereby in operation of the detector device, a varying photocurrent is produced which can be amplified in an AC system and recorded independently of the steady thermal background.

In FIG. 2, a suitable external circuit 18 is shown connected to the photoconductive element 15. This circuit includes a suitable D.C. voltage source 23 and a load resistor 24. A potential is applied across the photoconductive element 15 from the D.C. voltage source by means of the leads 17, 17 connected to the electrodes 16, 16 on the element 15. An amplifier 25 is connected across the load resistor 24 to amplify the change in current due to change in the conductivity of the photoconductive element 15 in response to a change in the intensity of the infrared radiation incident on the element 15. Suitable means 26 is connected to the amplifier 25 for recording or displaying the output from the amplifier.

The electrodes 16, 16 on the photoconductive element 15 may consist of a solder of 10% gallium 90% indium which is applied to the freshly etched doped germanium sample 15 with a cool soldering iron and wiped to a thin coating. The leads 17, 17, which may be copper, are soldered to the electrodes with pure indium solder.

In the arrangement of the photoconductive element 15 in the metal light pipe 14, the leads 17, 17 are sealed through the side wall or bottom of the light pipe, as the case may be, by means of a glass-to-metal seal of known construction.

The beryllium-doped germanium detectors of the invention may be prepared by the method described by Swiggard and Shenker in J. Electrochemical Soc. 113, 92, Jan, 1966. In this method, a pellet-dropping technique is adapted to the known horizontal zone melting process for single crystal growth. An ingot of germanium is placed in the zoner with a seed crystal of germanium and zone refined to remove electrically active impurities to a level of not more than $2 \times 10^{12}$ atoms per cm.$^3$ of germanium. A zone is then melted toward the front end of the ingot and a pellet of beryllium dropped into this molten zone by means of quartz spoon. The pellet will rapidly dissolve in the molten germanium. The zone is backed up slightly to remelt the polycrystalline growth caused by the sudden temperature drop in the zone. The zone melting is then carried out to the end of the ingot to develop single crystal growth. On solidification, the resulting ingot is electrically measured by known techniques to determine the beryllium concentration profile of the germanium ingot.

The beryllium doped germanium of the invention is acceptor or p-type semiconductor material with two acceptor levels. At liquid helium temperature, about 4.2° K., the ionization energy of the shallow acceptor level of the new beryllium-doped germanium materials is $0.0243 \pm .001$ ev. In operation of the infrared detector devices of the invention, a typical peak detectivity D* (50 microns, 1000 c.p.s., 1 c.p.s.) is $9 \times 10^{10}$ cm.-c.p.s.$^{1/2}$-w.$^{-1}$.

The efficiency of the beryllium-doped germanium infrared detectors of the invention is illustrated by the curve in FIG. 3 of the relative photoconductivity at wavelengths in the spectral region of from about 15 to 54 microns of a detector element 15 which is made of high purity germanium which has been doped with $1.1 \times 10^{16}$ atoms of beryllium per cm.$^3$ of germanium and which is maintained at liquid helium temperature.

Observation of the shape of the curve in FIG. 3 shows little structure in the region of 20 to 30 microns, which advantageous result is due in part to the relatively large amount of beryllium in the germanium which, resultingly, provides greater competitive absorption of the infrared at these wavelengths than by the germanium crystal lattice.

It is essential to the achievement of optimum results with the beryllium-doped germanium infrared detectors of the invention that they be maintained at or near liquid helium temperature which is about 4.2° K.

What is claimed and desired to be secured by Letters Patent of the United States is:

1. A device for detection of far infrared radiation comprising a photoconductive detector element of germanium doped with from about $1 \times 10^{15}$ to $2 \times 10^{16}$ atoms of beryllium per cm.$^3$ of germanium, means for maintaining said detector element at a temperature about equal to that of liquid helium, means to expose a surface of said detector element to far infrared radiation and means to measure the change in conductivity of said detector element in response to incident far infrared radiation.

2. A device for detection of far infrared radiation as defined in claim 1, in which the germanium is doped with about $1.1 \times 10^{16}$ atoms of berylium per cm.$^3$ of germanium.

References Cited

UNITED STATES PATENTS

| 2,547,173 | 3/1951 | Rittner | 252—501 X |
| 2,671,154 | 2/1954 | Burstein | 250—211 X |
| 3,357,872 | 12/1967 | Belasco. | |

FOREIGN PATENTS

| 75,447 | 4/1946 | Norway. |
| 133,335 | 3/1944 | Sweden. |

ARCHIE R. BORCHELT, Primary Examiner
C. M. LEEDOM, Assistant Examiner

U.S. Cl. X.R.

250—211; 252—501; 317—235